(12) United States Patent
Lisitsa et al.

(10) Patent No.: US 7,869,440 B2
(45) Date of Patent: *Jan. 11, 2011

(54) EFFICIENT SPLITTING AND MIXING OF STREAMING-DATA FRAMES FOR PROCESSING THROUGH MULTIPLE PROCESSING MODULES

(75) Inventors: Rafael S. Lisitsa, Bellevue, WA (US); George H. J. Shaw, Woodinville, WA (US); Dale A. Sather, Seattle, WA (US); Bryan A. Woodruff, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 981 days.

This patent is subject to a terminal disclaimer.

(21) Appl. No.: 11/204,683

(22) Filed: Aug. 16, 2005

(65) Prior Publication Data

US 2005/0286552 A1 Dec. 29, 2005

Related U.S. Application Data

(63) Continuation of application No. 09/310,596, filed on May 12, 1999, now Pat. No. 7,007,096.

(51) Int. Cl.
*H04L 12/28* (2006.01)
(52) U.S. Cl. ............... 370/395.7; 370/465; 370/395.71; 709/231; 709/238; 710/316; 710/317
(58) Field of Classification Search ................. 370/468, 370/536, 477, 395.7, 465, 253, 412, 389, 370/392, 352; 709/231, 203, 230–234, 238–242, 709/223–226; 710/100, 316, 317
See application file for complete search history.

(56) References Cited

U.S. PATENT DOCUMENTS 4,841,526 A 6/1989 Wilson et al.

(Continued)

FOREIGN PATENT DOCUMENTS

EP 0 550 196 7/1993

(Continued)

OTHER PUBLICATIONS

Kumar, Saravan, K.B., "WDM Video Streaming Filter Driver", California Software Company Limited, Nov. 26, 1999, 32 pages.

(Continued)

*Primary Examiner*—Dang T Ton
*Assistant Examiner*—Mandish Randhawa
(74) *Attorney, Agent, or Firm*—Wolf, Greenfield & Sacks, P.C.

(57) ABSTRACT

Streaming data is processed through one or more pipes of connected modules including mixers and/or splitters. The data is carried in composite physically allocated frames having virtual subframes associated with different ones of the splitters, mixers, and other transform modules. Nesting trees and pipe control tables represent the structure of the pipes. A frame allocator is assigned to a particular module in a pipe. Rather than issuing a control transaction to all modules when any one of them completes an operation upon its source data, a control manager requests a module to begin its operation only when all of its input subframes have become available. Frame control tables record when any module has completed an operation, and a pipe control table lists which modules provide data to which other modules.

20 Claims, 8 Drawing Sheets

U.S. PATENT DOCUMENTS

| | | | |
|---|---|---|---|
| 5,079,770 A * | 1/1992 | Scott | 370/536 |
| 5,282,202 A * | 1/1994 | Bernstein et al. | 370/468 |
| 5,471,603 A | 11/1995 | Yokote et al. | |
| 5,551,037 A | 8/1996 | Fowler et al. | |
| 5,608,651 A | 3/1997 | Leavy et al. | |
| 5,623,483 A | 4/1997 | Agrawal et al. | |
| 5,625,845 A | 4/1997 | Allran et al. | |
| 5,737,623 A | 4/1998 | Liebrock | |
| 5,758,086 A | 5/1998 | Maegawa | |
| 5,778,188 A | 7/1998 | Taniguchi et al. | |
| 5,815,689 A | 9/1998 | Shaw et al. | |
| 5,818,954 A | 10/1998 | Tomono et al. | |
| 5,825,430 A | 10/1998 | Adolph et al. | |
| 5,872,993 A | 2/1999 | Brown | |
| 5,909,595 A | 6/1999 | Rosenthal et al. | |
| 5,913,038 A | 6/1999 | Griffiths | |
| 6,012,136 A | 1/2000 | Brown | |
| 6,029,239 A | 2/2000 | Brown | |
| 6,055,364 A | 4/2000 | Speakman et al. | |
| 6,086,628 A * | 7/2000 | Dave et al. | 716/7 |
| 6,128,307 A | 10/2000 | Brown et al. | |
| 6,141,354 A | 10/2000 | Nakatsugawa et al. | |
| 6,175,957 B1 | 1/2001 | Ju et al. | |
| 6,195,739 B1 * | 2/2001 | Wright et al. | 712/19 |
| 6,205,492 B1 | 3/2001 | Shaw et al. | |
| 6,209,041 B1 | 3/2001 | Shaw et al. | |
| 6,212,568 B1 * | 4/2001 | Miller et al. | 709/236 |
| 6,212,574 B1 | 4/2001 | O'Rourke et al. | |
| 6,249,903 B1 * | 6/2001 | McSherry et al. | 716/11 |
| 6,278,478 B1 | 8/2001 | Ferriere | |
| 6,311,221 B1 | 10/2001 | Raz et al. | |
| 6,334,175 B1 * | 12/2001 | Chih | 711/170 |
| 6,340,997 B1 | 1/2002 | Borseth | |
| 6,353,450 B1 * | 3/2002 | DeLeeuw | 715/768 |
| 6,353,862 B1 | 3/2002 | Hamilton | |
| 6,356,945 B1 * | 3/2002 | Shaw et al. | 709/231 |
| 6,405,237 B1 * | 6/2002 | Khalidi et al. | 709/203 |
| 6,502,137 B1 | 12/2002 | Peterson et al. | |
| 6,594,773 B1 | 7/2003 | Lisitsa et al. | |
| 6,640,248 B1 | 10/2003 | Jorgensen et al. | |
| 6,658,477 B1 | 12/2003 | Lisitsa et al. | |
| 6,748,440 B1 * | 6/2004 | Lisitsa et al. | 709/231 |
| 7,000,022 B2 * | 2/2006 | Lisitsa et al. | 709/231 |
| 7,007,096 B1 * | 2/2006 | Lisitsa et al. | 709/231 |
| 7,496,677 B2 * | 2/2009 | Lisitsa et al. | 709/231 |

FOREIGN PATENT DOCUMENTS

| | | |
|---|---|---|
| EP | 0 847 191 | 6/1998 |
| EP | 0 915 598 A2 | 5/1999 |
| EP | 0 915 598 A3 | 9/2003 |
| JP | 02-138673 | 5/1990 |
| JP | 02-224637 | 9/1990 |
| JP | 05-265781 | 10/1993 |
| JP | 06-290064 | 10/1994 |
| WO | WO 97 50242 | 12/1997 |
| WO | WO 99 45492 A2 | 9/1999 |
| WO | WO 99 45492 A3 | 11/1999 |

OTHER PUBLICATIONS

"Data Flow in the Filter Graph", retrieved from http://www.microsoft.com/devonly/tech/amovldoc/amsdk107.htm on Nov. 4, 1999, 6 pages.

"About Filter Graph Architecture", retrieved from http://www.microsoft.com/devonly/tech/amovldoc/amsdk012.htm on Nov. 4, 1999, 8 pages.

"Understanding Time and Clocks in DirectShow", retrieved from http://www.microsoft.com/DirectX/dxm/help/ds/appdev/understanding_time_clocks.htm on Nov. 3, 1999, 4 pages.

Connell, Edward, V., et al.: "Combinative Interactions of a Human Immunodeficiency Virus (HIV) Tat Antagonist with HIV Reverse Transcriptase Inhibitors and an HIV Protease Inhibitor", Antimicrobial Agents and Chemotherapy, Feb. 1, 1994, pp. 348-352, XP 000654722.

Rubine, Dean. et al.: "Low-Latency Interation Through Choice-Points, Buffering, and Cuts in Tacnis", Proceedings of the International Conference on Multimedia Computing and Systems, May 14-19, 1994, XP 000541903.

Horn, F.: "On Porgramming and Supporting Multimedia Object Synchronization", Computer Journal, Oxford University Press, 1993, pp. 4-18, vol. 36, No. 1, XP 000360261.

Ravindran, K., et al.: "Delay Compensation Protocols for Synchronization of Multimedia Data Streams", IEEE Transactions of Knowledge and Data Engineering, Aug. 4, 1993, pp. 574-589, vol. 5, No. 4, XP 002162224.

* cited by examiner

EFFICIENT SPLITTING AND MIXING OF STREAMING-DATA FRAMES FOR PROCESSING THROUGH MULTIPLE PROCESSING MODULES

CROSS REFERENCE TO RELATED APPLICATIONS

This application is a continuation of U.S. patent application Ser. No. 09/310,596, filed May 12, 1999 and entitled, "EFFICIENT SPLITTING AND MIXING OF STREAMING-DATA FRAMES FOR PROCESSING THROUGH MULTIPLE PROCESSING MODULES." The entirety of the aforementioned application is incorporated herein by reference.

FIELD OF THE INVENTION

The present invention relates to electronic data processing, and more specifically concerns managing the flow of streaming data through multiple hardware and/or software processing modules in a computer.

BACKGROUND OF THE INVENTION

Streaming data is a continuous flow of data that must be ultimately presented to a user in a particular sequence in real time. Digital samples representing an audio signal, for example, must be converted to a sound wave in the same sequence they were transmitted, and at exactly the time spacing they were generated, or some user-specified alternative. Digital data representing video frames require assembly into the proper sequence in the frame for presentation on a display together, and successive frames must display at the correct real-time rate.

Streaming data need not necessarily maintain correct sequence or timing throughout an entire communication chain among various transmitters, processors, memories, and receivers. Indeed, video and audio clips are frequently stored as static data in recording media, computer memories, and network buffers. Packet-switched systems might also carry parts of the same streaming data over different paths and even in different time sequences. Processors such as digital filters can assemble parts of the data stream, modify them as a static unit, then release them to further units in the system. Eventually, however, the stream must be heard or seen in the correct sequence at the proper relative times.

Streaming data almost always involves very large amounts of data. Streaming data almost always challenges the capacity of digital buses in computers to access it, carry it and switch it. Streaming data almost always taxes the processing power of functional units, both software and hardware, to receive it, convert it, and pass it on to other units. Those in the art speak of the necessity of "fat pipes" for streaming data.

An architecture called WDM-CSA (Windows Driver Model Connection and Streaming Architecture) introduces the concept of a graph for specifying the connections among the facilities of a computer where a data stream must pass through a number of processing units in an efficient manner. The WDM-CSA protocol also simplifies the development of drivers for such data. Basically, WDM-CSA specifies the flow of data frames through a graph, and also the control protocols by which adjacent modules in the graph communicate with each other to request and accept the data frames.

Commonly assigned patent application "Improving the Flow of Streaming Data through Multiple Processing Units," filed on even date herewith (U.S. Pat. No. 7,000,022), introduces the concept of data pipes for enhancing the data flow of streaming-data frames through a graph of interconnected modules in WDM-CSA and in other streaming-data environments. Basically, data pipes avoid redundant storage and copying of data as a number of modules process the frames, and streamline allocation of the frames in which the data is packaged. Another commonly assigned application, "Improving the Control of Streaming Data through Multiple processors," filed on even date herewith (U.S. Pat. No. 6,658,477), presents a mechanism for controlling the flow of frames through multiple modules by improving the control throughout the entire graph, rather than by optimizing each individual module separately. These applications are incorporated by reference.

In many applications of streaming data, processing could be simplified and improved by adding capabilities for splitting one large frame into multiple subframes and for mixing multiple frames together into a single large frame. For example, multimedia presentations commonly have a single collection of data representing different modalities that are to be output together to a user. A frame of television-type data may represent an entire field of an NTSC signal, including video data on a number of scan lines, audio data, a picture-in-picture frame on parts of some of the scan lines, and data in a video blanking interval (VBI). VBI data might include character codes for close-captioning, digital data representing Web-TV information, and a variable number of other subfields. These frames require complex mixing of data when they are generated, and then must be split apart for processing by different hardware or software modules concurrently for presentation to a viewer. While the audio data in one subframe is filtered in tone controls and compressed/expanded in volume, the video data is resized and color balanced, the close-captioning is formatted and positioned, and so forth.

The systems described in the patent applications noted above describe primitive abilities for splitting large frames into smaller frames for separate processing. However, the growing need for multimedia and similar data streams having multiple types of data demands the further ability to combine, merge, or mix multiple frames into a single frame, and also requires efficient data flow and control of split and mixed frames of streaming data.

SUMMARY OF THE INVENTION

The present invention improves the overall processing of streaming data through a network or graph of multiple hardware and software processing modules by providing a simple and efficient mechanism for splitting a single frame of streaming data into multiple frames and for mixing multiple streaming-data frames into a single frame.

A pipe has multiple interconnected processing modules, one or more of which performs an operation that splits, mixes, or otherwise restructures streaming data. A physically allocated composite frame has subframes that hold different parts of the data that are operated upon by different ones of the modules.

Another aspect of the invention constructs a pipe and assigns an allocator to provide the composite frames. A further aspect issues control transactions to a module only when all the subframes sourced to that module have become available. Other aspects concern the construction of tables for specifying the structure of the subframes in the composite frame, the structure of the modules in the pipe, and the completion of operations by the modules.

BRIEF DESCRIPTION OF THE DRAWING

FIG. 4, comprising FIGS. 4A-4C, is a block diagram of an example streaming-data pipe handled by the invention, and representations of data flowing therein.

FIG. 5, comprising FIGS. 5A-5E, is a block diagram of another streaming data pipe, and representations of alternative composite data frames therein.

FIG. 6, comprising FIGS. 6A and 6B, is a flowchart of a method for setting up and controlling a graph having composite frames according to the invention.

FIG. 7, comprising FIGS. 7A-7B, shows tables constructed in the method of FIG. 6.

DETAILED DESCRIPTION

The following detailed description of preferred embodiments refers to the accompanying drawings that form a part hereof, and shows by way of illustration specific embodiments of the present invention. These embodiments are described in sufficient detail to enable those skilled in the art to practice the invention. Structural, logical, and procedural modifications within the spirit and scope of the invention will occur to those in the art. Likewise, the specific forms and sequence in which the description presents the hardware, software, and operations of the embodiments does not imply any specific interconnections or time order. The following description is therefore not to be taken in a limiting sense, and the scope of the inventions is defined only by the appended claims.

Operating Environment

Figure 1:
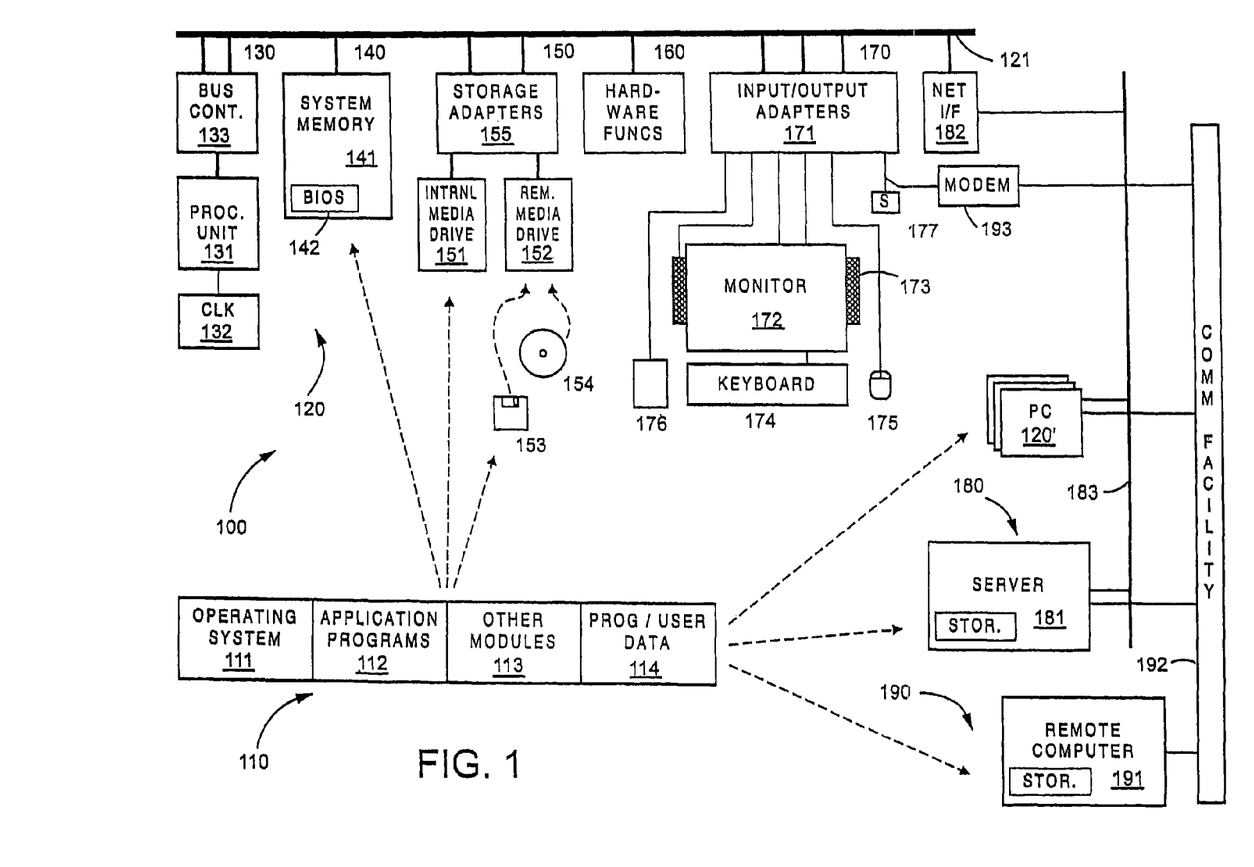
FIG. 1 is a block diagram of an illustrative environment for the present invention.

FIG. 1 is a high-level diagram of an illustrative environment 100 in which the invention is implemented as executable instructions, data, and/or hardware on a programmable general-purpose computer such as personal computer (PC) 120. Other suitable environments, and variations of the described environment, will occur to those skilled in the art.

A conventional PC 120 typically comprises a number of components coupled together by one or more system buses 121 for carrying instructions, data, and various control signals. These buses may assume a number of forms, such as the conventional ISA, PCI, and AGP buses. Some or all of the units coupled to a bus can act as a bus master for initiating transfers to other units.

Processing unit 130 may have one or more microprocessors 131 driven by system clock 132 and coupled to one or more buses 121 by controllers 133. Internal memory system 140 supplies instructions and data to processing unit 130. High-speed RAM 141 stores any or all of the elements of software 110. ROM 142 commonly stores basic input/output system (BIOS) software for starting PC 120 and for controlling low-level operations among its components. Bulk storage subsystem 150 stores one or more elements of software 110. Hard disk drive 151 stores software 110 in a nonvolatile form. Drives 152 read and write software on removable media such as magnetic diskette 153 and optical disc 154. Other technologies for bulk storage are also known in the art. Adapters 155 couple the storage devices to system buses 121, and sometimes to each other directly. Other hardware units and adapters, indicated generally at 160, may perform specialized functions such as data encryption, signal processing, and the like, under the control of the processor or another unit on the buses.

Input/output (I/O) subsystem 170 has a number of specialized adapters 171 for connecting PC 120 to external devices for interfacing with a user. A monitor 172 creates a visual display of graphic data in any of several known forms. Speakers 173 output audio data that may arrive at an adapter 171 as digital wave samples, musical-instrument digital interface (MIDI) streams, or other formats. Keyboard 174 accepts keystrokes from the user. A mouse or other pointing device 175 indicates where a user action is to occur. Block 176 represents other input and/or output devices, such as a small camera or microphone for converting video and audio input signals into digital data. Other input and output devices, such as printers and scanners commonly connect to standardized ports 177. These ports include parallel, serial, SCSI, USB, FireWire, and other conventional forms.

Personal computers frequently connect to other computers in networks. For example, local area network (LAN) 180 connect PC 120 to other PCs 120' and/or to remote servers 181 through a network adapter 182 in PC 120, using a standard protocol such as Ethernet or token-ring. Although FIG. 1 shows a physical cable 183 for interconnecting the LAN, wireless, optical, and other technologies are also available. Other networks, such as wide-area network (WAN) 190 can also interconnect PCs 120 and 120', and even servers 181, to remote computers 191. FIG. 1 illustrates a communications facility 192 such as a public switched telephone network for a WAN 190 such as the Internet. PC 120 can employ an internal or external modem 193 coupled to serial port 177; however, other known technologies such as ISDN, asynchronous transfer mode (ATM), frame-relay, and others are becoming more widespread. In a networked or distributed-computing environment, some of the software 110 may be stored on the other peer PCs 120', or on computers 181 and 191, each of which has its own storage devices and media.

Software elements 110 may be divided into a number of types, whose designations overlap to some degree. For example, the previously mentioned BIOS sometimes includes high-level routines or programs which might also be classified as part of an operating system (OS) in other settings. The major purpose of OS 111 is to provide a software environment for executing application programs 112. An OS such as Windows® from Microsoft Corp. commonly implements high-level application-program interfaces (APIs), file systems, communications protocols, input/output data conversions, and other functions. It also maintains computer resources and oversees the execution of various programs. Application programs 112 perform more direct functions for the user. The user normally calls them explicitly, although they can execute implicitly in connection with other applications or by association with particular data files or types. Modules 113 are packages of executable instructions and data which may perform functions for OSs 111 or for applications 112. These might take the form of dynamic link libraries (.dll). Finally, data files 114 includes collections of non-executable data such as text documents, databases, and media such as graphics images and sound recordings. Again, the above categories of software 110 are neither exhaustive nor mutually exclusive.

Figures 2, 3:
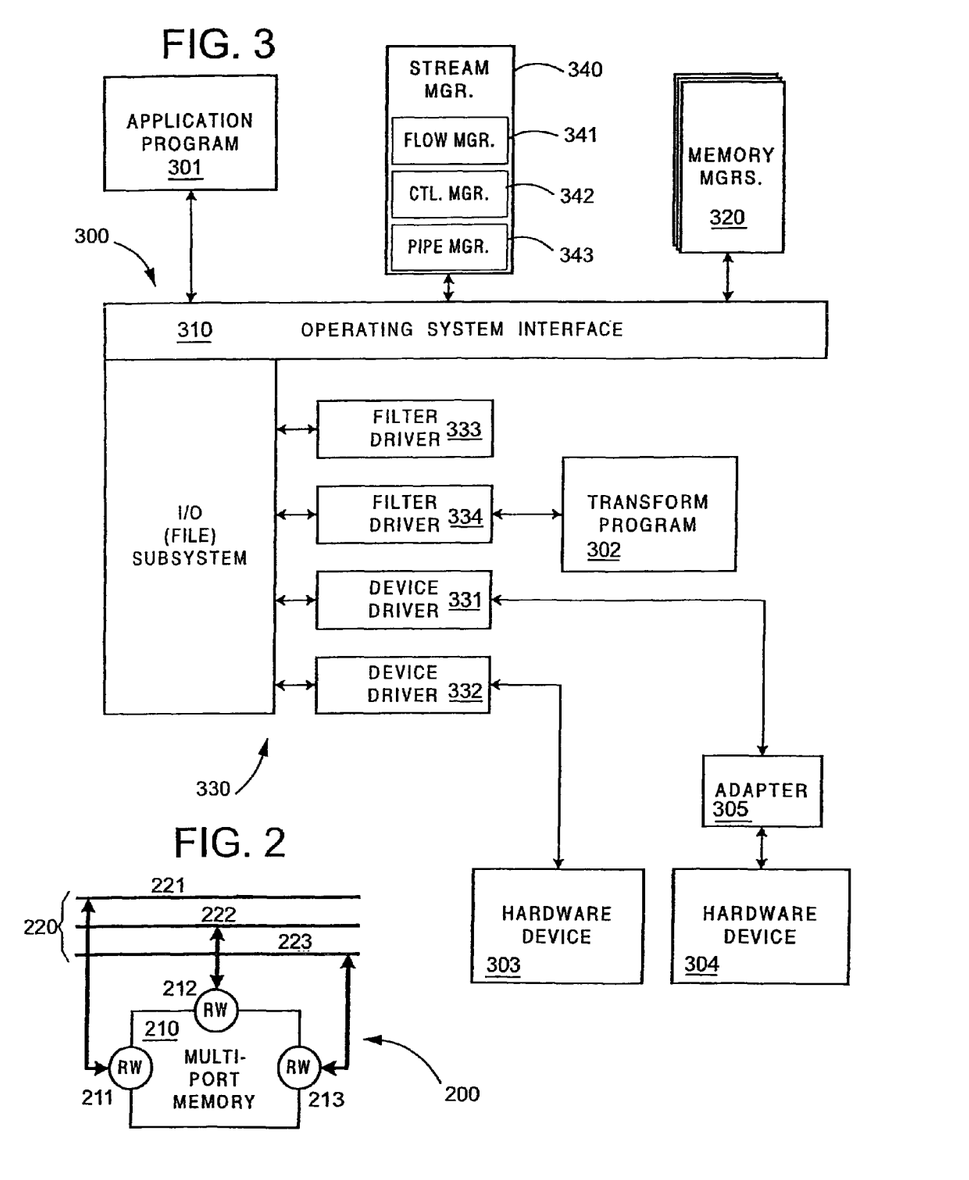
FIG. 2 details a multi-port memory of FIG. 1.
FIG. 3 details components of FIG. 1 relevant to the invention.

FIG. 2 is a block diagram of one type of conventional memory 200 that is often employed in processing high-speed data such as streaming data. Memory module 210 is a multi-port memory 210 having three read/write ports 211-213, each of which can both receive data for storage in module 210 and retrieve data already stored there. More or fewer ports are possible, and some of the ports can be write-only or read-only. Operations at multiple ports can occur simultaneously, although the internal operation of module 210 might serialize and/or synchronize them. Memory 200 can form apart of PC memory system 140, FIG. 1, or might be built into any of the other blocks, such as functions 160 or adapters 170. Multiport memories frequently function to buffer large quantities of data for transfer from one bus to another in a system. FIG. 2 illustrates a group of buses 220, which can be included in the group of buses 121 in FIG. 1. Ports 211-213 couple to individual buses 221-223, respectively. This connection allows, for example, a PCI bus to deposit a data frame to memory module 210, and an AGP or dedicated video bus to retrieve the frame.

Handling Composite Frames

FIG. 3 shows the relevant components 300 that the present invention employs. For purposes of illustration only, some of the components described are found in the Windows-2000 operating system (OS) from Microsoft Corp. Components 310-330 live in the kernel layer, although they can reside at other locations in the architecture of a particular OS. Although all of the processing in this example occurs in a single computer, streaming-data operations according to the invention could be distributed among multiple machines and/ or operating systems.

Interface component 310 interfaces with other components at the kernel layer, with software such as programs 301 and 302 outside the OS, and with hardware devices such as devices 303-304 and hardware adapter 305. Application program 301 might be, for example, a viewer utility by which a user selects certain streaming data for presentation. A program or other module that requests or specifies a stream of data will be referred to as a client. Program 302 represents a software module for transforming data in some way, such as a software digital filter or compander. Device 303 could be a hardware module such as a memory or an MPEG-2 decoder. Device 304 might represent an off-line storage device such as a DVD player or a cable TV, with its hardware interface adapter 305.

Physical memories in system 100 have memory manager components 320 for organizing the data stored in them. A single physical memory module can have multiple managers for organizing different data at different times or in different parts of the module. A single manager can also serve multiple physical memories. The significant function of managers 320 in the present context is to allocate and deallocate blocks of memory for storing frames or other units of streaming data. For this reason, managers 320 will frequently be referred to as memory allocators herein. A frame is allocated whenever newly arriving data requests it, or it can be pre-allocated. The frame carries the data through one or more filters in a path, and is deallocated when all filters in the path have finished processing that data. Frames can be destroyed, but are usually recycled with further new data arriving in the path.

In Windows-2000, an I/O subsystem 330 supervises both file storage and other I/O devices and facilities. Requests for file or I/O services are routed from an application program or other source to hardware devices such as 303 and 304 via one or more layers of device drivers such as 331 and 332. Along the way, filter drivers such as 333 and 334 may intercept the data, file handles, I/O request packets, and other information, based upon certain characteristics or events. Filter drivers can process data internally as shown at 333. They can also pass information back and forth to programs such as 302, which can be located within the OS kernel layer or at any other point in the software architecture of system 100. Components can be dedicated to a single function, or, more often, can be programmed to carry out multiple functions, either sequentially or concurrently. A digital signal processor, for example, can execute many different functions such as frequency filtering, gain changing, and acoustic effects.

Block 340 represents the WDM-CSA components that build and manage graphs for streaming data, and includes a graph data-flow manager 341 and a graph control-flow manager 342. Block 340 also includes a pipe manager that builds several objects used by the invention, as explained in detail below. Managers 341-343 need not be implemented in single software or hardware modules; their functions can easily be distributed among many such modules.

Figure 4A:
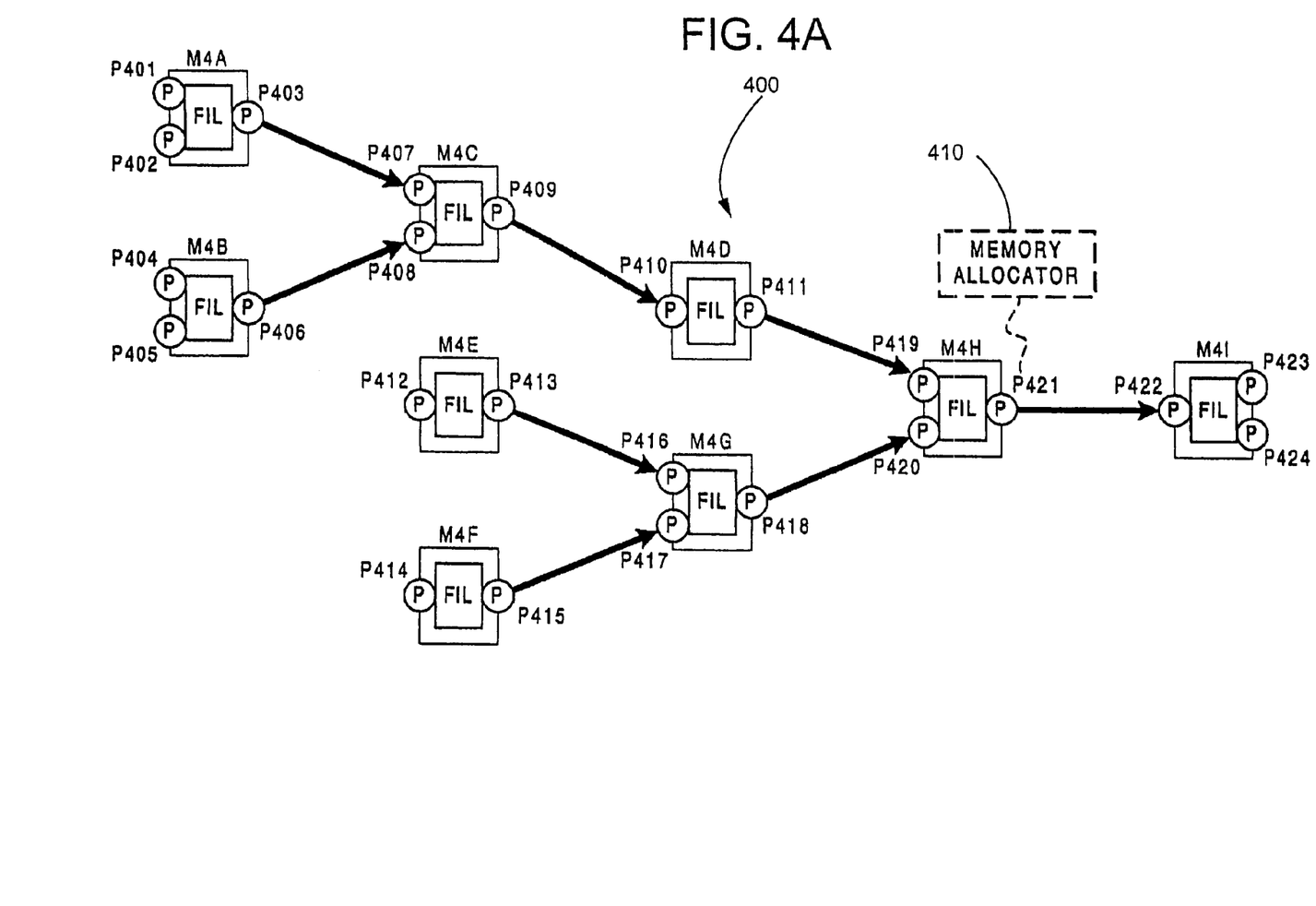

FIG. 4A shows one pipe 400 of a graph such as shown in application 09/310,610 for transferring one or more streams of data through selected ones of the components 300 in order to achieve one or more overall transformations of the data. Individual hardware or software processing modules, usually called filters, are shown as light rectangles surrounding heavier function blocks. In the conventions of the WDM-CSA protocol, functions communicate data to each other by means of logical pins, labeled P. For the present purposes, filters are of two broad types. Non-restructuring filters perform a function or transformation upon data. Restructuring filters have three or more pins, and are capable of splitting or mixing frames of streaming data. Some can both mix multiple input frames and split a frame into multiple outputs. The term "restructuring" will be used to refer to mixing, splitting, and other operations that alter the frame structure of their data. The term "splitter/mixer" refers to a module that performs one or more restructuring operations. Heavy arrows signify the transfer of data among the different functions.

Filter functions that mix or split data frames are becoming much more common as streaming data becomes more complex. However, these restructuring functions are difficult to integrate efficiently into a graph. One of the concepts of application 09/310,610 is to increase overall efficiency by dividing a graph into pipes. It is difficult, however, to incorporate cascaded or multiple splitters and mixers into a single pipe. None of the pipes in that application include more than one restructuring function.

Using this invention, the single pipe 400 includes nine filters, six of which are restructuring: five mixers and one splitter. Filter module M4A mixes input streaming-data frames arriving at pins P401 and P402 to produce a combined frame at pin P403, while module M4B mixes input frames at pins P404 and P405 into a merged frame at P406. A further mixer M4C accepts these two frames at pins P407 and P408 and outputs another merged frame at P409. Modules M4A, M4B, and M4C might also perform some other processing function or transformation, such as signal compression or filtering, in addition to mixing. Module M4D is a simple function that processes frames at pin P410 and outputs them at P411. Modules M4E and M4F process input frames at pins P412 and P414 into the inputs P416 and P417 of mixer M4G, which combines them at P418. Mixer module M4H accepts frames from P411 and P418 at connected input pins P419 and P420, merging them into a single composite frame at pin P421. Finally, splitter module M4I produces multiple outputs at pins P423 and P424. This module might also perform processing in addition to splitting a single frame into subframes.

Every streaming data pipe includes a memory allocator for allocating and deallocating memory frames for the streaming data passing through a pipe. The overall allocated frame is referred to as a physical frame, because it occupies physical space in a memory. Subframes within the overall frame are called virtual frames, in that they live within the overall frame, and do not require separate or additional physical memory space. Dashed box 410 indicates one position for an allocator 410 for pipe 400; in this example, the allocator is assigned to pin P421 of module M4H. Application 09/310,610 discusses how to select the position and specifications of an allocator for a given pipe. As discussed below, an allocator for the present purposes can allocate more complex frames than those for application 09/310,610.

Figures 4B, 4C:
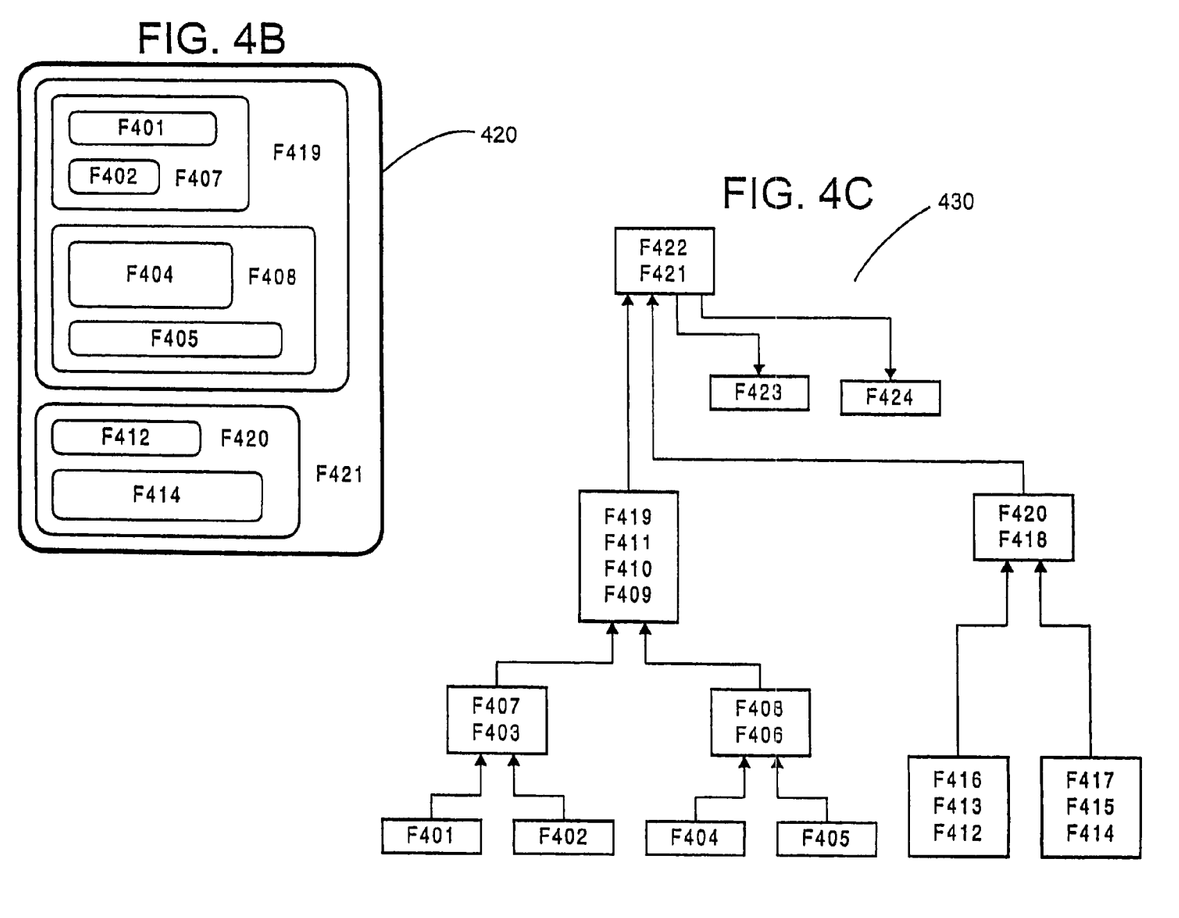

FIG. 4B symbolizes a complex data frame 420 for use with the example pipe 400 of FIG. 4A. In this description, the term "frame" can refer to any frame, whether or not it forms a part of another frame or has other frames within it. The term "composite frame" refers to a frame that has or may have other frames nested within it. A "subframe" is a frame that is or may be nested within another frame. The composite frame 420 is called F421, because it represents the overall data frame handled by allocator 410 located at pin P421. The two subframes of frame F421 are labeled F419 and F420 because they occur at pins P419 and P420. F419 in turn has further subframes F407 and F408. Input frames F401, F402 and F404, F405 are subframes of F407 and F408, respectively. The subframes of F420 are input frames F412 and F414.

FIG. 4C shows another representation 430 of the structure of the overall composite frame for pipe 400. Composite-frame nesting tree 430 has directed edges representing the direction of data flow. There are three possible cases, depending upon the graph-relative positions of the pins that are associated with the frames. One pin can be upstream, downstream, or at the same level as the other pin. Input subframes F401 and F402 flow into a node containing a frame that can be labeled as both F403, referenced to output pin P403, or as F407, referenced to pin P407. Input subframes F404 and F405 similarly flow into node F406/F408. Subframes F407 and F408 similarly mix in a frame labeled F409, F410, F411, or F419, because the same frame exists at all four of the corresponding pins. Likewise, the same subframes F416 and F417 can also be labeled F412, F413 and F414, F415, respectively. These are also subframes of F418, also known as F420. This upstream flow ends at the merging of F419 and F420 into the full composite frame F421, F422. Downstream data flow from this full frame proceeds to its subframes F423 and F424.

Streaming data frames through a pipe using a single overall physical frame such as F421 requires that stream manager 340, FIG. 3, provide the frame's memory management and control. This requires resolving the frame allocator's dependencies, which can be done by building the nesting trees such as 430. Conventional operating-system streaming-data facilities do not provide sufficient constraints to generate a unique nesting in some cases. The relevant information provided by WDM-CSA, for example, is limited to the framing properties of individual module pins, the topology of the graph, and the boundaries of the data pipes.

FIG. 5 illustrates a problematic situation. In FIG. 5A, pipe 500 includes two simple functions M5A and M5B and two restructuring functions, a mixer/splitter M5C and a mixer M5D. The convention for naming pins and frames follows that of FIG. 4.

One advantage of the invention is that it reduces the number of pipes in many streaming-data graphs, by avoiding the placement of cascading mixers and splitters in separate pipes. However, a single overall graph can still include multiple composite-frame pipes according to the invention. In that case, the pipes are joined to each other in the same manner as that described in application 09/310,610.

Figure 5A:
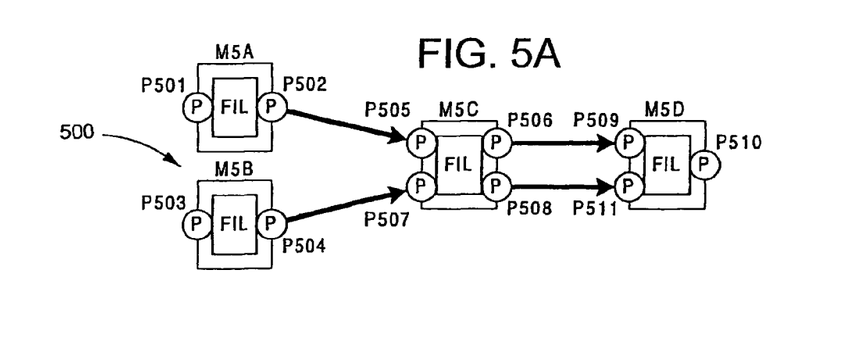
Figure 5B:
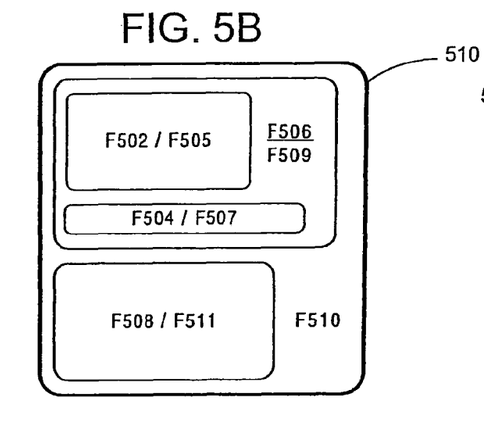

FIG. 5B shows one possible layout 510 of a composite frame serving pipe 500. The mixer portion of module M5C mixes subframe F502 (same as F505) with subframe F507 (F504) into composite frame F506 and frame F508. Mixer M5D then combines these two frames into another composite frame F510 at output pin P510 of the pipe. Nesting-tree diagram 520, FIG. 5C, shows this solution in the same form as trees 430 represent the frame layout of pipe 400, FIG. 4.

Figure 5C:
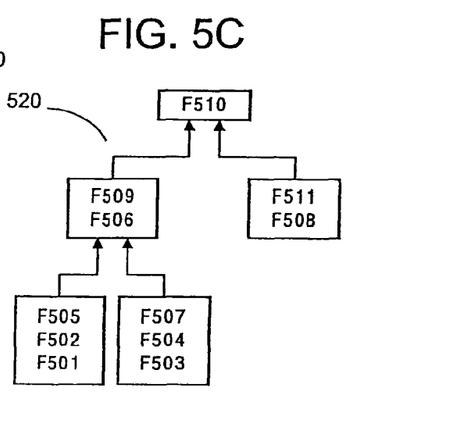
Figure 5D:
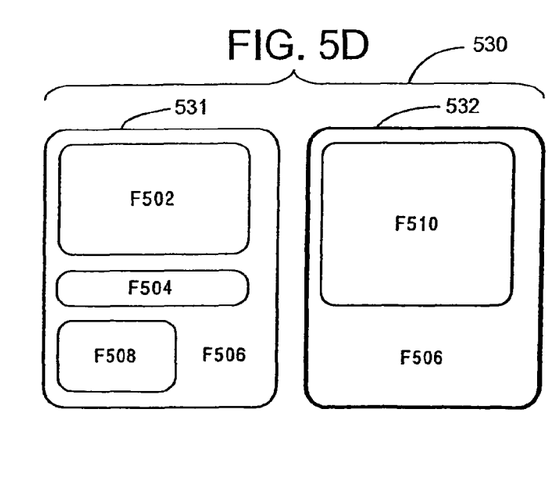
Figure 5E:
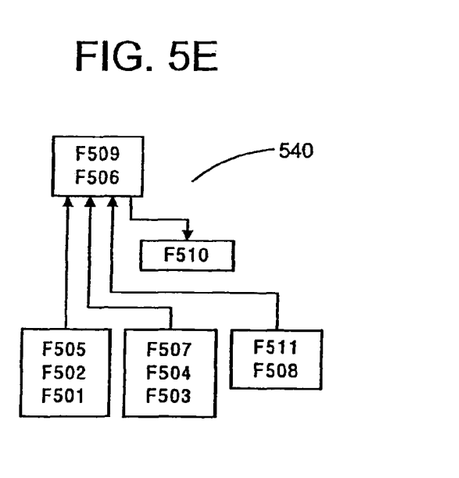

FIG. 5D shows another configuration 530 for the same pipe 500. Frame layout 531 has subframes F502, F504, and F508 nested in a composite frame F506 at a point where module M5C has finished mixing them, but before module M5D begins merging its input data at pins P509 and P511. Nesting tree 540 in FIG. 5E demonstrates that module M5D need not actually allocate more memory for its output composite frame F510 than the memory required for its inputs F509 and F511; it can output the mixed data directly into composite frame F509 (same as frame F506).

Thus, a first configuration, FIGS. 5B and 5C, has frame F510 as the overall physical frame allocated by function module M5D for pipe 500. In a second configuration, FIGS. 5D and 5E, module M5C allocates frame F506 as the single overall physical frame. Both configurations satisfy the graph topology and the boundaries of pipe 500. Therefore, the general case necessitates additional constraints in order to specify frame allocators for composite frames. Stream manager 340, which has access to the overall graph functions, can supply this information in the form of additional composite-frame nesting trees.

The first objective in improving streaming data flow is to assign an allocator to each pipe to manage the overall frame for that pipe. Application 09/310,610 discusses the operation of memory allocators 320, FIG. 3, for simple frames, and how to position them within pipes. The present invention extends such allocators to handle complex nested frames.

Figure 6A:
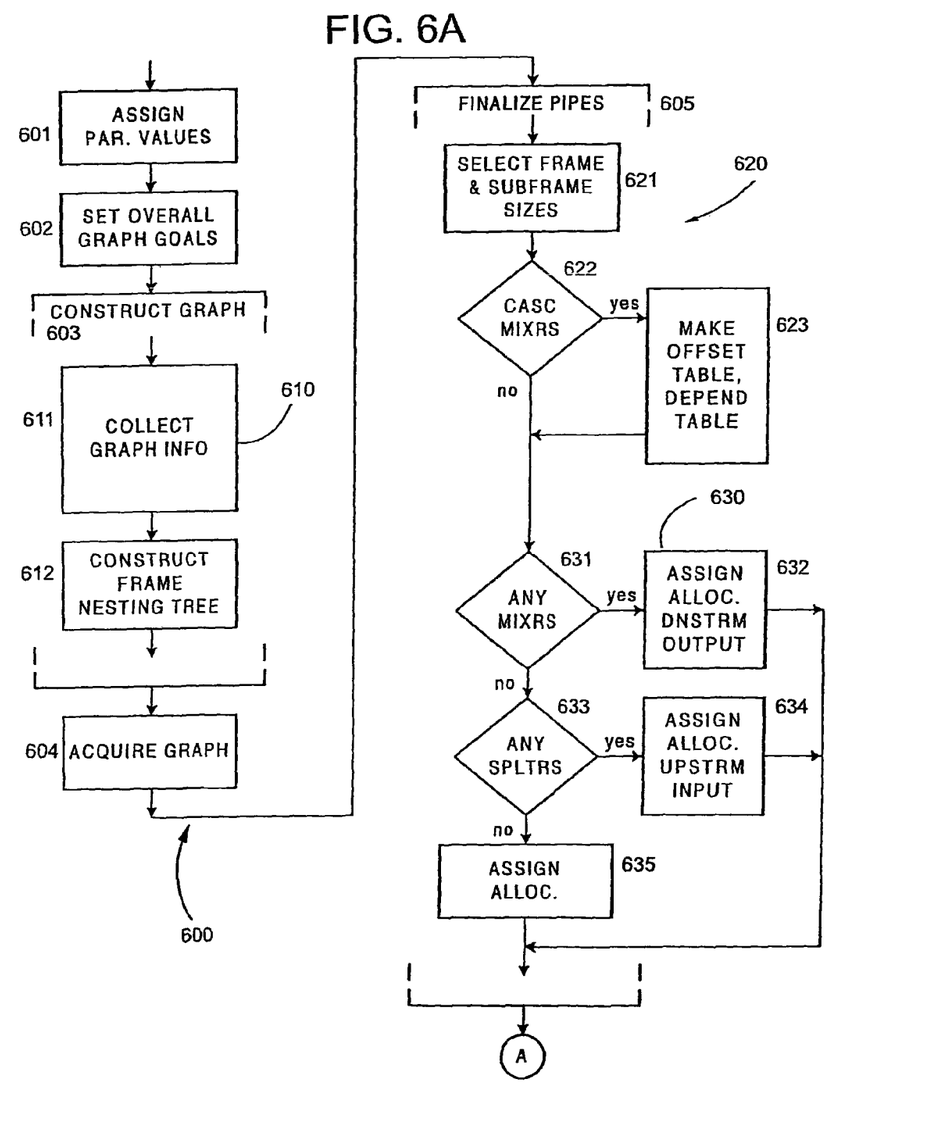

FIG. 6 recapitulates the overall data-flow process of application 09/310,610, and adds a method for improving the flow of composite-frame data. Block 601 of FIG. 6A assigns values of certain parameters to each function unit in a streaming-data graph. In block 602, the user, application program, or other client software sets overall goals for the graph.

Block 603 constructs the desired graph, including defining a preliminary set of pipes. Blocks 610 perform additional operations for composite frames. Block 611 collects parameter data assigned to the filters in block 602 concerning subframes from the modules of the graph. One parameter is the filter-suggested pipe topology: the association between pins and pipes for each filter. A filter expresses this information as optional properties for mixers and splitters, as the set of lists of the filter's pins that correspond to a particular pipe. For example, mixer M4G, FIG. 4, specifies that pins P416, P417, and P418 can belong to a single pipe. A filter can specify multiple topologies in order of their preference. The WDM-CSA stream manager 340 selects one pipe topology for each filter from the filter-suggested list when it builds the pipes for the whole graph. A "constant offset" flag can promise that a filter will maintain a subframe at the same position within its composite frame at all times when the graph is played. This flag is set as a framing property of the filter pin associated with the subframe. If the flag is set, a subframe-offset value specifies the constant offset. (These two can be combined; e.g., a negative offset value can act as a flag that the subframe offset is not guaranteed to be constant.) The offset value is a number of bytes relative to the composite frame address of the same filter. Graph manager 340 will compute the subframe addresses relative to the actual physical frame of its pipe from the pipe-wide nesting tree and each filter's subframe offsets. In a very few cases, such as when the graph client requires unusual memory transforms, an additional nesting tree must be supplied; this is the situation depicted in FIGS. 5D and 5E.

Block 612 construct a unique nesting tree for each pipe that has a composite frame. When an application 112 sets up to play a graph, it acquires the graph at block 604.

Block 605 finalizes the pipes. Blocks 620 set up composite frames within the overall process of block 605. Block 621 selects the sizes of the overall frame and of any subframes, if it is composite.

Block 622 determines whether or not the pipe has any cascaded mixers, such as M4A-M4C-M4D-M4H and M4G-M4H in FIG. 4A. If so, block 623, performed by pipe manager 343, FIG. 3, constructs two tables 700 specifying the layout of a composite frame. As shown in FIG. 7A, offset table 710 has an entry 711 for each pin of each module in a pipe and a column 712 listing an offset amount for each entry. The illustrative entries in FIG. 7 follow the example pipe 400 shown in FIG. 4. The subframe F401 at pin P401 in FIG. 4A is offset from the beginning of the overall composite frame F421 by a byte amount symbolized by the quantity Offset #01, and similarly for the other subframes. The subframes at some pins are of course the same as those at other pins, so that multiple ones of the entries have the same offset. Pipe control table 720 in FIG. 7B has an entry 721 for each filter module in the pipe. Column 722 lists other modules in the same pipe that source data frames to that module. For example, module M4C receives streaming data from filter modules M4A and M4B. Modules in "Start" section 723 accept data from outside the pipe. Entries 724 indicate dependent modules. Tables 710 and 720 need not be rebuilt or modified after the graph is finalized. The use of these tables for improving the control flow of the streaming graph is discussed below, in connection with FIG. 6B.

Blocks 630 position the pipe's memory allocator. If 631 finds any mixers within the pipe, block 632 assigns the allocator to the output pin of the mixer farthest downstream in the data flow. In example pipe 400, this is pin P421 of module M4H. If block 633 finds that the pipe contains no mixers but does include splitters, block 634 assigns the allocator to the input pin of the splitter farthest upstream in the pipe. In example pipe 400, this would be pin P422 of module M41. If there are no mixers or splitters, block 635 assigns an allocator as described in application 09/310,610.

Figure 6B:
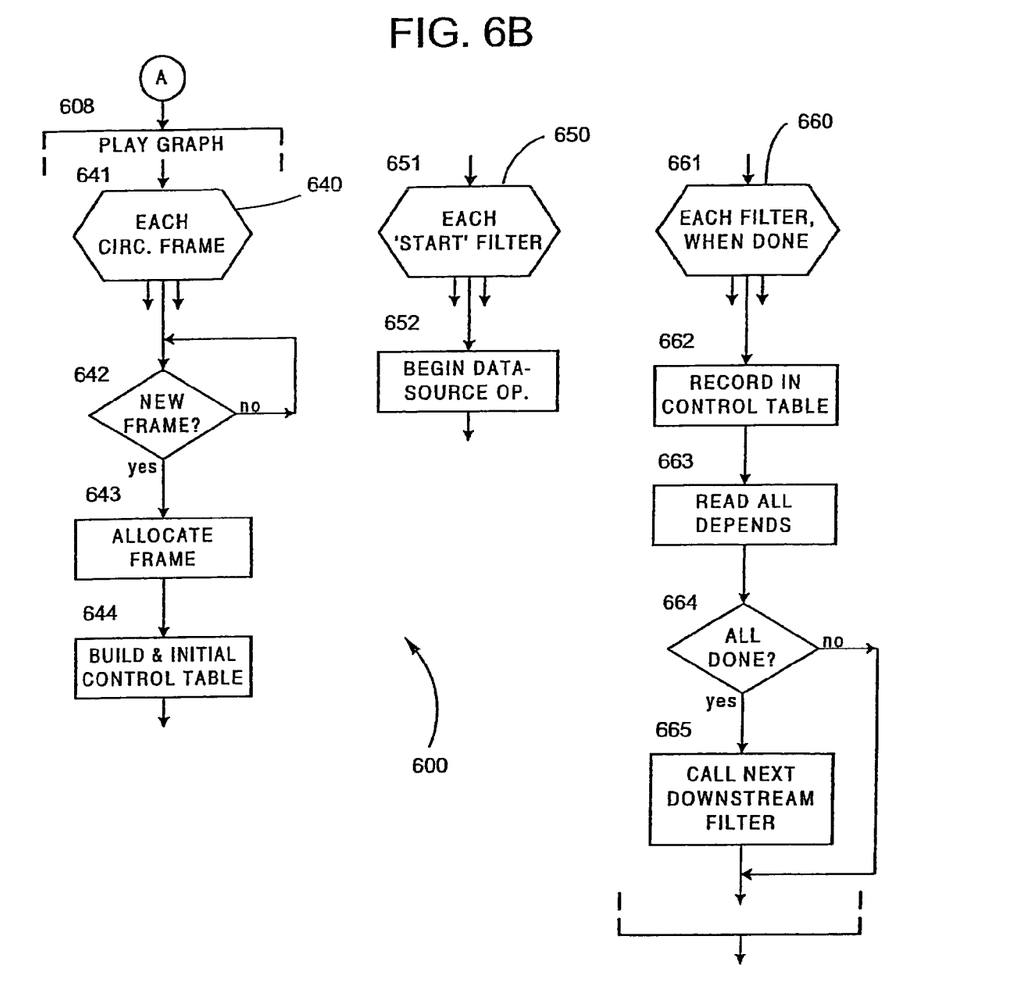
Figures 7A, 7B:
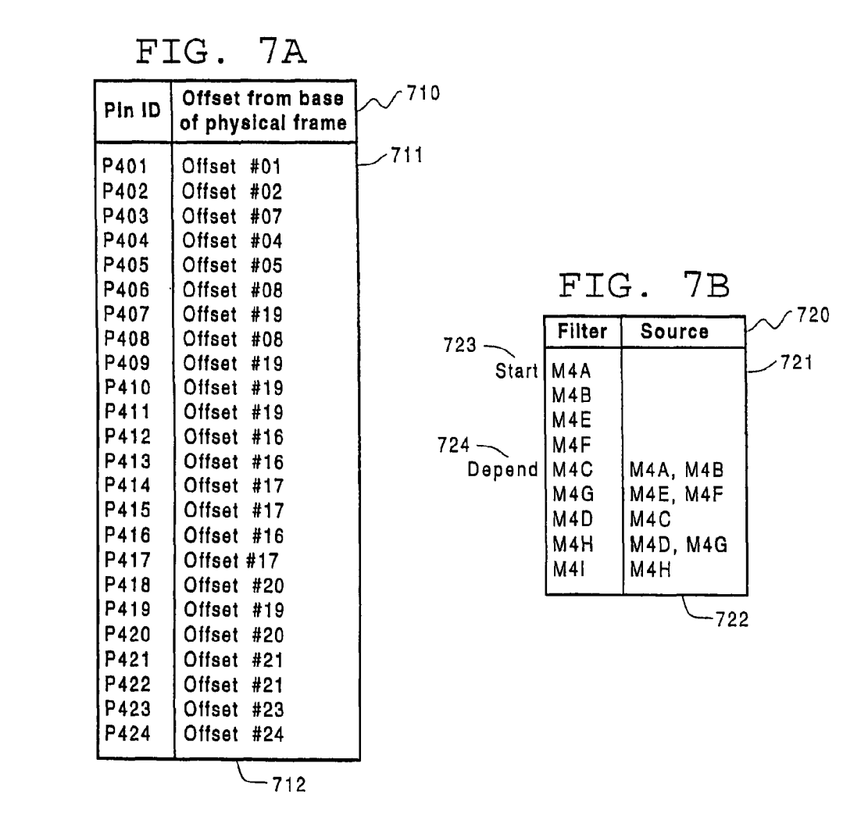

The graph is ready to play—that is, ready to process streaming data through its modules—in block 606 of FIG. 6B.

Control of the graph during play can employ the mechanisms described in copending application 09/310,610, using I/O request packets (IRP) sent from one pin to another to send a data frame and to return completed frames.

Where a pipe has cascaded mixers as described above, the invention not only improves the data flow, but can also improve the control flow to reduce processing overhead when the graph is played. An important aspect of streaming graphs is to minimize the overall number of control transactions required to manage the flow of composite frames for propagating streaming data in a pipe. Control is already efficient for cascading splitters in a pipe, because data and control flow in the same direction. For cascading mixers within a pipe, however, data flow and control have opposite directions, because frames divide into subframes in an upstream direction, toward the sources of the data. Conventional streaming-graph control would begin control transactions at the root of the composite-frame nesting tree, and propagate upstream relative to the data flow. This can create a significant amount of overhead. For example, the entire pipe 400 of FIG. 4 must propagate an I/O request packet (IRP) or other control transaction through all the filters before it can commence pulling data from any of the sources M4A, M4B, M4E, and M4F into subframes F401, F402, F404, and F405. A conventional control sequence for pipe 400 would proceed as follows:

M4H allocates physical frame F421 and splits it to allocate frames F419 and F420.
M4H issues IRP to upstream filter M4D, passing the offset of F419.
M4H issues IRP to upstream filter M4G, passing the offset of F420.
M4D issues IRP to upstream filter M4C, passing the offset of F419.
M4G splits F420 to allocate frames F416 and F417.
M4G issues IRP to upstream filter M4E, passing the offset of F416.
M4G issues IRP to upstream filter M4F, passing the offset of F417.
M4C splits F419 to allocate frames F407 and F408.
M4C issues IRP to upstream filter M4A, passing the offset of F407.
M4C issues IRP to upstream filter M4B, passing the offset of F408.

Therefore, filters M4C, M4D, M4H, and M4G must process each subframe twice: once to allocate a subframe, and again to process the data. When any of a set of upstream filters completes its subframe, the issuing filter must check whether its other upstream filters have finished. For example, if M4A returns completed subframe F407 to M4C, M4C must check whether its subframe P408 is complete.

With the present system of composite frames, a pipe can support multiple subframes allocated and circulating simultaneously. In the common case where subframes maintain a fixed relationship to the overall frame, it is possible to improve control flow within a pipe by performing just-in-time control transactions. Setting the previously mentioned constant-offset flag indicates that no synchronization or custom management is required, and that the offsets of the subframes from the beginning of the composite frame never change.

FIG. 6B shows how to improve flow control in a pipe having constant-offset subframes by avoiding the traversal of the entire pipe and the issuance of a control transaction at every transaction time, that is, whenever any filter completes a subframe, whether or not that completion allows another further processing to occur. When the filters in a pipe have their constant-offset flags set, blocks 640-660 are performed to execute transactions only at times necessary for the actual flow of data. In addition, the frame status information recorded in these blocks provides clear and simple pipe-wide run-time context information that is helpful to those who design and maintain streaming systems, which are complex, asynchronous, and distributed. FIG. 6B shows the operation of only a single pipe; often a graph contains multiple pipes running at the same time.

Figure 8:
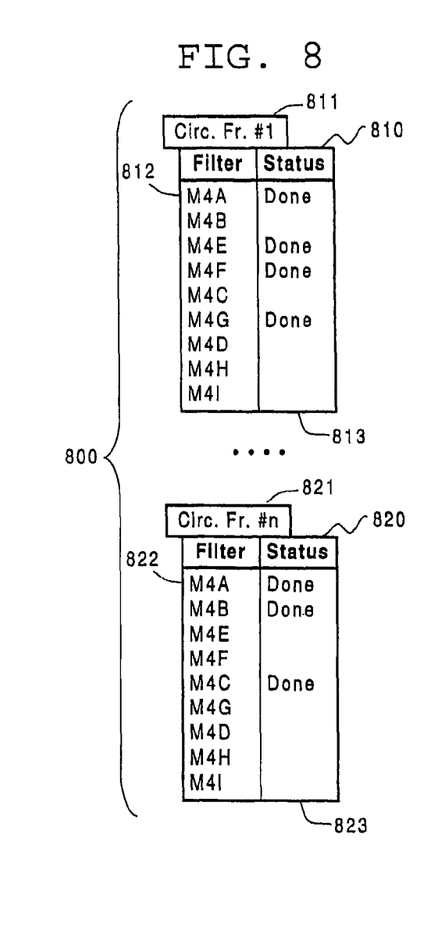
FIG. 8 shows a further table constructed in the method of FIG. 6.

Blocks 640 execute asynchronously for each frame in a pipe, as symbolized at block 641; a pipe can have multiple frames circulating at the same time. Whenever block 642 detects that the pipe needs a new frame, block 643 causes allocator 410, FIG. 4 to create it. Block 644 builds and initializes a new control table for that frame. FIG. 8 shows frame control tables 800 for several active frames. Table 810, associated by tag 811 with a first circulating frame, has an entry 812 for each filter module M4A-M4I, again using pipe 400 as an illustrative example. Column 813 contains a flag for each entry, indicating whether or not each module has processed that particular frame. Table 820, associated by tag 821 with another frame in circulation at the same time, has the same entries 822, although of course the values of flags 823 will usually differ. A newly created table has all flags cleared.

Blocks 650 are performed by each filter module listed in the "Start" section 723 of pipe control table 720, FIG. 7, as symbolized at block 651. After blocks 640 have issued a new frame, each start module begins a data-sourcing operation 652 to fill its subframe of the new frame from outside the pipe—from another pipe or from a storage or other hardware device.

Blocks 660 are executed repeatedly and asynchronously by each pipe module, as the filters perform their operations. Whenever block 661 finds that a particular filter has completed its operation on a frame or subframe, block 662 places a completion flag 813 or 823 in the entry 812 or 822 of the table 810 or 820 for that circulating frame. For each entry 721 in which it appears as a source in column 722, block 663 causes a module to check the frame control table to determine whether all other modules that supply data to the same downstream module have completed their operations on that frame. If block 664 finds that all these other modules have completed their operations on that frame (i.e., if the completion flags for their entries are set), then block 665 initiates a control transaction for the next module downstream in the pipe. That is, a downstream module is called only when all of its data has become available.

For example, when module M4B, FIG. 4, has completed acquiring and processing subframe F406, it sets its completion flag in the appropriate frame control table. Then it looks at the pipe control table and finds that downstream filter M4C also depends upon subframe F403 from module M4A. Module M4B reads the same frame control table to determine whether module M4A had already reported completion of subframe F403 by setting the flag for its frame control table entry. If so, M4B initiates a control transaction to M4C to begin mixing frames F403 and F406. Otherwise, no control transaction occurs at that time. Then, at a later time when M4A completes processing subframe F403 and sets the M4A flag, it looks and finds that M4B has already set its flag. Therefore, M4A calls module M4C. That is, the last module to finish a subframe required by a downstream module is the only one that initiates a control transaction for that module.

As stated earlier, this method is carried out for every pipe in a graph that has composite frames. In the most general case, a multiple pipes can pass through the same filter; to accommodate this situation, it is possible to base the frame control tables and the pipe control tables upon individual module pins, rather than upon the filters themselves. Any inter-pipe dependencies, such as data-size requirements, time synchronization, resource usage, overall graph goals, and so forth, are addressed by the pipe managers among themselves in a conventional manner.

CONCLUSION

The present invention improves the data flow and the control of streaming data through a graph having splitter/mixer processing modules for restructuring the data as well as for transforming it.

Although only splitters and mixers have been discussed specifically, they can be considered as instances of a broader class of restructuring operations in which the invention also finds utility. For example, a sending filter might transfer multiple subframes to a receiving filter through a single output pin. One practical application is a silence-compression filter having a single input pin and a single output pin. Such a filter receives a frame of audio data at its input pin, parses the data to skip all the silent periods, then passes the non-silent segments to a downstream filter via the single output pin. This subgraph—the silence compressor and its downstream consumer—can be implemented using a single pipe with multiple subframes. The input frame of the silence compressor is the composite frame, the multiple output subframes of the silence compressor are the parts of the input composite frame. Such an implementation reduces the memory used by the subgraph, because it employs a single composite frame for the entire subgraph. It can also reduce the CPU processing load, if much of the data are not overridden by the silence compressor.

What is claimed is:

1. A method for processing frames of streaming data through modules in a digital computer, comprising:
    constructing a pipe as a connected group of multiple ones of the modules, at least one of the modules being a restructuring module that alters the frame structure of the data;
    allocating composite frames having predefined subframes;
    transporting the streaming data through different ones of the modules in the group in different ones of the subframes;
    restructuring the data among at least some of the subframes in the restructuring module, wherein the restructuring includes altering the frame structure of the data; and
    assigning an allocator for the composite frames to one of a farthest upstream restructuring module in the pipe or a farthest downstream restructuring module in the pipe.

2. The method of claim 1 where the composite frame is a physical frame in a memory.

3. The method of claim 2 where the subframes are virtual frames defined in the same memory as the physical frame.

4. The method of claim 1 where the allocator is assigned to the farthest upstream restructuring module in the pipe when the modules comprise at least one mixer.

5. The method of claim 1 where the allocator is assigned to the farthest downstream restructuring module in the pipe when every restructuring module among the modules in the pipe is a splitter.

6. The method of claim 1 further comprising constructing a frame nesting tree specifying how the data is to be restructured in the restructuring module.

7. A computer system for processing streaming data, comprising:
    a plurality of filters for processing the streaming data, at least some of which are restructuring filters, wherein the restructuring includes altering the frame structure of the data;
    a plurality of memory managers for allocating composite frames containing subframes for containing streaming data; and
    a processor for executing a plurality of modules, the modules comprising:
        a flow manager for constructing a graph having a pipe, the pipe including a plurality of the restructuring filters that alter the frame structure of the data, and for assigning one of the memory managers to a restructuring filter included in the pipe.

8. The system of claim 7 further comprising a memory for storing the composite frames.

9. The system of claim 8 where the subframes are allocated within the composite frames in the memory.

10. The system of claim 7 further including an input/output system.

11. The system of claim 10 where the input/output system implements one or more of the modules.

12. The system of claim 7 further comprising a pipe manager for constructing representations of the structures of the composite frames.

13. The system of claim 12 where one of the representations specifies locations of the subframes with respect to the composite frame.

14. The system of claim 12 where one of the representations specifies relationships of the modules within the pipe.

15. The system of claim 7 further including a control manager for transporting the streaming data through the modules in various ones of the subframes.

16. The system of claim 15 where the control manager issues a control transaction to one of the restructuring module for initiating processing of a subframe therein only when all of the subframes processed by that module become available.

17. The computer system of claim 7, wherein at least one of the restructuring filters specifies a pipe topology, and constructing the graph by the flow manager comprises constructing the pipe including the at least one of the restructuring filters based at least in part on the pipe topology.

18. The computer system of claim 7, wherein the flow manager assigns the one of the memory managers to one of a farthest upstream restructuring filter in the pipe or a farthest downstream restructuring filter in the pipe.

19. A computer memory device bearing instructions and data for causing a digital computer to execute a method for processing frames of streaming data through multiple modules disposed in a pipe including at least one restructuring module in a digital computer, the method comprising:
    allocating a composite frame having multiple subframes;
    performing operations upon the subframes in a plurality of modules sourcing data to the restructuring module;
    for each of said plurality of modules, after completion of the operations upon the subframe for said module, checking whether all of the plurality of modules have completed their respective operations upon their respective subframes, and when all of said plurality of modules have completed their respective operations, issuing a control transaction to the restructuring module; and
    performing operations upon the subframes sourced to the restructuring module in response to the control transaction.

20. The computer memory device of claim 19, further comprising:
    for each of said plurality of modules, after completion of the operations upon the subframe for said module, setting a completion flag,
    wherein checking whether all of the plurality of modules have completed their respective operations comprises checking the completion flag for each of the other modules among the plurality of modules and determining all of the plurality of modules have completed their respective operations when the completion flag for each of the other modules among the plurality of modules is set.

* * * * *